(12) United States Patent
Nickell et al.

(10) Patent No.: US 8,898,183 B2
(45) Date of Patent: *Nov. 25, 2014

(54) ENABLING USERS SEARCHING FOR COMMON SUBJECT MATTER ON A COMPUTER NETWORK TO COMMUNICATE WITH ONE ANOTHER

(75) Inventors: Seth Nickell, Cambridge, MA (US); Bryan Clark, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/549,923

(22) Filed: Jul. 16, 2012

(65) Prior Publication Data
US 2012/0284294 A1    Nov. 8, 2012

Related U.S. Application Data

(63) Continuation of application No. 11/160,897, filed on Jul. 14, 2005, now Pat. No. 8,229,951.

(51) Int. Cl.
    *G06F 17/30*    (2006.01)
(52) U.S. Cl.
    CPC .................. *G06F 17/30864* (2013.01)
    USPC ............... 707/767; 715/758; 709/204
(58) Field of Classification Search
    USPC ............... 707/767; 709/204; 715/758
    See application file for complete search history.

(56) References Cited

U.S. PATENT DOCUMENTS

| | | | |
|---|---|---|---|
| 5,793,365 A | 8/1998 | Tang et al. | |
| 6,006,225 A | 12/1999 | Bowman et al. | |
| 6,321,228 B1 | 11/2001 | Crandall et al. | |
| 6,345,290 B2 | 2/2002 | Okada et al. | |
| 6,430,558 B1 | 8/2002 | Delano | |
| 6,559,863 B1 | 5/2003 | Megiddo | |
| 6,651,086 B1 | 11/2003 | Manber et al. | |
| 6,671,681 B1 | 12/2003 | Emens et al. | |
| 6,732,088 B1 | 5/2004 | Glance | |
| 6,745,178 B1 | 6/2004 | Emens et al. | |
| 6,823,363 B1 | 11/2004 | Noveck et al. | |
| 6,832,218 B1 | 12/2004 | Emens et al. | |
| 7,257,766 B1 | 8/2007 | Koppel et al. | |
| 7,263,526 B1 | 8/2007 | Busey et al. | |
| 7,328,031 B2 | 2/2008 | Kraft | |
| 7,356,772 B2 | 4/2008 | Brownholtz et al. | |
| 2003/0001890 A1 | 1/2003 | Brin | |
| 2003/0046281 A1 | 3/2003 | Son | |

(Continued)

FOREIGN PATENT DOCUMENTS

WO    WO 02093414 A1 * 11/2002

OTHER PUBLICATIONS

Vernooij, The ControlProxy Manual, Jan. 5, 2004.*

(Continued)

*Primary Examiner* — William Spieler
(74) *Attorney, Agent, or Firm* — Lowenstein Sandler LLP

(57) ABSTRACT

A method and computer system including launching a dialog window for two users to communicate with one another via respective client devices relating to a particular subject. A search query is received from an additional user including a keyword associated with the particular subject. In response to the request, a backlog of a recent discussion between the two users relating to the particular subject is retrieved and provided to the additional user, wherein the backlog includes a suggested link relating to the recent discussion.

15 Claims, 12 Drawing Sheets

(56) References Cited

U.S. PATENT DOCUMENTS

| | | | |
|---|---|---|---|
| 2003/0078972 | A1 | 4/2003 | Tapissier et al. |
| 2003/0088623 | A1 | 5/2003 | Kusuda |
| 2003/0195928 | A1 | 10/2003 | Kamijo et al. |
| 2004/0049539 | A1 | 3/2004 | Reynolds et al. |
| 2004/0225716 | A1 | 11/2004 | Shamir et al. |
| 2005/0080868 | A1 | 4/2005 | Malik |
| 2005/0097089 | A1 | 5/2005 | Nielsen et al. |
| 2005/0149576 | A1 | 7/2005 | Marmaros et al. |
| 2005/0193099 | A1 | 9/2005 | Reus et al. |
| 2005/0223315 | A1 | 10/2005 | Shimizu et al. |
| 2005/0234883 | A1 | 10/2005 | Szeto et al. |

OTHER PUBLICATIONS

Is Google crawling IRC?, Google News Archive forum at WebmasterWorld.com (2003) (accessed Nov. 5, 2013).*

Non-Final Office Action for U.S. Appl. No. 11/160,897 mailed Jan. 9, 2008.

Final Office Action for U.S. Appl. No. 11/160,897 mailed Aug. 12, 2008.

Non-Final Office Action for U.S. Appl. No. 11/160,897 mailed Dec. 24, 2008.

Final Office Action for U.S. Appl. No. 11/160,897 mailed Aug. 10, 2009.

Non-Final Office Action for U.S. Appl. No. 11/160,897 mailed Apr. 29, 2010.

Final Office Action for U.S. Appl. No. 11/160,897 mailed Nov. 2, 2010.

Non-Final Office Action for U.S. Appl. No. 11/160,897 mailed Mar. 7, 2011.

Final Office Action for U.S. Appl. No. 11/160,897 mailed Aug. 31, 2011.

Advisory Action for U.S. Appl. No. 11/160,897 mailed Sep. 30, 2008.

Advisory Action for U.S. Appl. No. 11/160,897 mailed Jan. 21, 2010.

Advisory Action for U.S. Appl. No. 11/160,897 mailed Jan. 10, 2011.

Advisory Action for U.S. Appl. No. 11/160,897 mailed Nov. 4, 2011.

Notice of Allowance for U.S. Appl. No. 11/160,897 mailed Mar. 21, 2012.

* cited by examiner

ENABLING USERS SEARCHING FOR COMMON SUBJECT MATTER ON A COMPUTER NETWORK TO COMMUNICATE WITH ONE ANOTHER

CROSS-REFERENCE TO RELATED APPLICATION

This application is a continuation of U.S. patent application Ser. No. 11/160,897, filed Jul. 14, 2005, the entirety of which is incorporated herein by reference.

FIELD OF THE INVENTION

The present invention relates to a computer-implemented technique for enabling users who are searching for common subject matter on a computer network, such as by using web browser-based search engines, to communicate with one another to form a search party to share information between users that are actively conducting a search relating to the common subject matter. There is no need for the users to already know each other or otherwise be associated with one another.

DESCRIPTION OF RELATED ART

Despite the tremendous growth of raw data on the World Wide Web, people are often the best source of information due to their ability to tailor data to specific situations. Chat rooms, such as Internet Relay Chat (IRC), and Yahoo!® chat, web forums, and mailing lists, for instance, allow like-minded people to communicate with one another and disseminate information. For example, a group of people interested in cross-country skiing might start a chat room or web forum on this topic. These approaches work well for people with a persistent interest in a topic. However, people who have only an infrequent or ephemeral interest in a subject are not likely to seek out a discussion channel on the subject. Moreover, no mechanism is available for enabling users who are searching for common subject matter on the Internet or other computer network, such as by entering search terms in a web browser for a search engine, to communicate with one another.

BRIEF SUMMARY

The present invention addresses the above and other issues by providing a technique for enabling users who are searching for common subject matter on a computer network to communicate with one another.

In one aspect of the invention, a computer-implemented method is provided for enabling users searching for common subject matter on a computer network to communicate with one another. The method includes receiving respective search queries made by the users via respective client devices in searching the computer network, determining which of the respective search queries are for common subject matter, and enabling particular ones of the users whose search queries are for the common subject matter to communicate with one another via their respective client devices.

In another aspect of the invention, a computer-based system is provided for enabling users searching for common subject matter on a computer network to communicate with one another. The system includes at least one server resource for receiving respective search queries made by the users via respective client devices in searching the computer network, for determining which of the respective search queries are for common subject matter, and for enabling particular one of the users whose respective search queries are for the common subject matter to communicate with one another via their respective client devices.

In a further aspect of the invention, a computer-implemented method is provided for enabling a particular user searching for subject matter on a computer network to communicate with other users who are also searching for the subject matter. The method includes transmitting, to at least one server resource, a search query made by the particular user via a respective client device in searching the computer network. The at least one server resource identifies the other users who have entered search queries for the subject matter via their respective client devices. The method further includes receiving data from the at least one server resource for enabling the particular user to communicate with the other users.

In a further aspect, a computer-implemented method is provided for enabling users searching for common subject matter on a computer network to communicate with one another. The method includes receiving, at a server resource, respective search queries made by the users via respective client devices in searching the computer network, determining which of the respective search queries are for the common subject matter, performing respective searches using the respective search queries of particular ones of the users whose respective search queries are for the common subject matter to obtain respective search results, and transmitting the respective search results with scripts to the respective client devices of the particular users. The scripts are executable at the respective client devices of the particular users to enable the particular users to communicate with one another via their respective client devices.

In yet another aspect, a computer-implemented method is provided for enabling a particular user searching for subject matter on a computer network to communicate with other users who are also searching for the subject matter. The method includes transmitting, to at least one server resource, a search query made by the particular user via a respective client device in searching the computer network for the subject matter, receiving search results with a script from the at least one server resource, wherein the search results are responsive to the search query, and executing the script to enable the particular user to communicate with the other users who are also searching for the subject matter via respective client devices.

Corresponding program storage devices are also provided.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION

Figure 1:
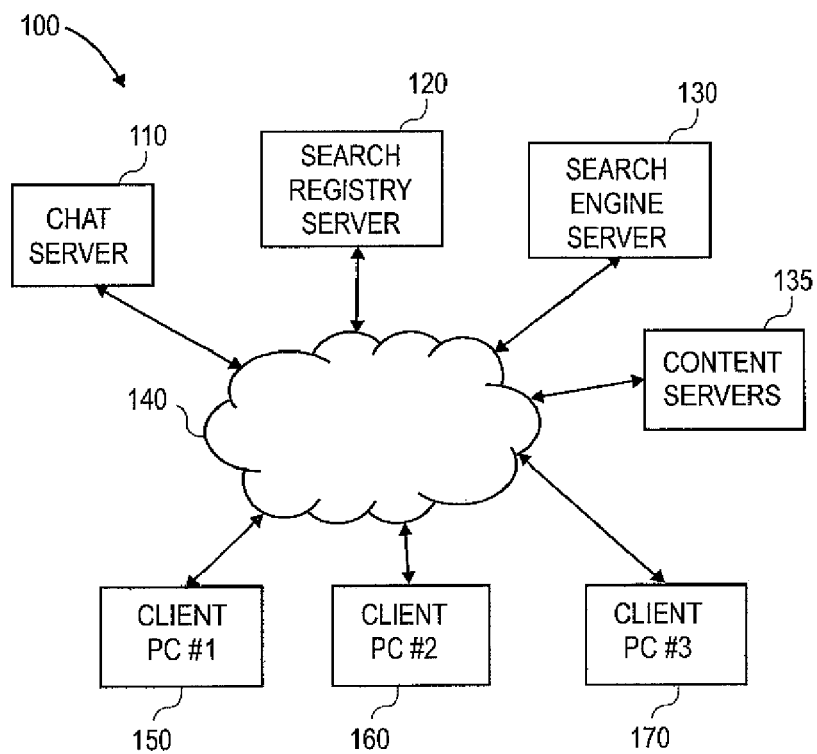
FIG. 1 illustrates an exemplary computer network that enables users who are searching for common subject matter to communicate with one another, according to an embodiment of the present invention.

FIG. 1 illustrates a computer network that enables users who are searching for common subject matter to communicate with one another, according to the invention. The network, shown generally at 100, includes a chat server 110, a search registry server 120, a search engine server 130, content servers 135 and a number of client devices such as personal computers (PC) 150, 160 and 170. The clients and servers can communicate with one another via a communication medium 140. The client PCs run applications such as web browsers for search engines that allow the respective users to search resources available on the network 100, such as resources stored at the search engine server 130 or at the content servers 135. The resources can include web pages, other files with text or graphics, multimedia files, and so forth. The communication medium 140 can be provided by the Internet or a private intranet, for instance.

When a user enters a search query in a search engine running at the respective PC, the PC transmits the query to the search engine server 130. Generally, search engines use automated software programs known as spiders or bots to survey a network such as the Web to build a database. Resources such as web documents are retrieved by the programs and analyzed, typically by keyword, and data collected from each resource is added to a search engine index. When the search engine server 130 receives a user's query, the query is checked against the search engine's index of all the web pages it has analyzed. Links to the resources that match the query most closely are then returned to the user and displayed on the search engine interface, typically ranked in order of relevance. The user can then select a desired link to view the resource in detail. Resources that are frequently requested by users may be stored locally at the search engine server 130 for quicker access. Otherwise, the search engine server 130 provides a link to the user that allows the resource to be accessed directly from one of any number of content servers worldwide. Different search engine servers may be operated by different entities. Example search engines that are currently popular include Google, Yahoo!®, AltaVista, and Ask Jeeves, which are registered trademarks of their respective owners.

A chat server 110 allows any number of users to engage in an on-line dialogue with one another such as an on-line chat. A chat generally refers to a real-time communication between users via computer. Once a chat has been initiated, a user can enter text by typing on the keyboard, and the entered text will appear on the other users' screens.

In accordance with the invention, a search registry server 120 is provided which also receives the search queries from the users. The search registry server 120 analyzes the search queries to identify users that are searching for common subject matter. A similarity in the search terms provided by different users can be used to establish that the users have a mutual interest in a topic. For example, if a number of users enter the search term "superbowl" on respective search engine interfaces, software running at the search registry server 120 can conclude that the users are interested in the same topic. The search terms need not be identical in order for the search registry server 120 to determine that they relate to common subject matter. Groupings of related words can be established using a variety of well-known techniques. For example, large corpuses of data can be scanned for proximal occurrences of words. Using these groupings, associations between different search terms can be automatically inferred. For instance, it may be inferred that the search terms "superbowl" and "football" are related to common subject matter, such that users providing these terms should be joined in a common search party, such as a chat room or other online dialogue. It can be concluded that search queries relate to common subject matter when they include the same or synonymous keywords, in the same order or any order, or when a commonality is indicated by techniques such as word associations, probabilistic analysis or fuzzy matching, for instance.

When it is determined that the search terms of different users relate to common subject matter, the search registry server 120 sends a message to the identified users informing them that other users are currently searching for information relating to the same subject matter. The search registry server 120 can also communicates with the chat server 110 to initiate an on-line dialogue such as a chat, which is one possible aspect of the search party, for the subject matter. The chat server 110 or the search registry server 120 transmits a message to the identified users to inform them that the dialogue has been created and to give them the opportunity to participate in the search party. Additional users that subsequently search for the common subject matter can also be identified and given the opportunity to participate. The users can be informed of the existence of the dialogue, how many users are currently actively participating and/or how many users are eligible to participate. The number of users that have declined to participate in the dialogue can be inferred based on the difference between the number of users eligible and the number of users participating. The search registry server 120 can also communicate with the chat server 110 to determine how many users are currently participating in a dialogue.

Moreover, multiple dialogues can be conducted at the same time for different subjects. Users that participate in a dialogue can view the search terms that were provided by the other users in the dialogue as well as view comments entered by the other users, and enter their own comments to share with the other users. Additionally, the users can share links to resources, such as web pages, with the other users in the dialogue. Users can also elect to have any search terms they provide, until they leave the search party, automatically shared with the other users accessing the search party, without requiring manual user intervention. Once in a dialogue, a user may exit by entering a specific command, or the user may be automatically removed after a specified time-out period in which the user is inactive, for instance.

The search registry server 120 may employ a defined time window in analyzing which search queries are for common subject matter. In one possible approach, a relatively small time window, such as one minute or a few minutes, is used so that the dialogues will contain real-time exchanges between users that are currently on line. However, it is also possible to use a longer time window so that a user can be matched to a dialogue that was created some time ago.

Note that the chat server 110, search registry server 120, and the search engine server 130 need not be independent, but may be integrated in whole or in part. Generally, any server resource arrangement, regardless of the number, configuration and location of specific server machines, may be used to achieve the functionality described herein.

Figure 2:
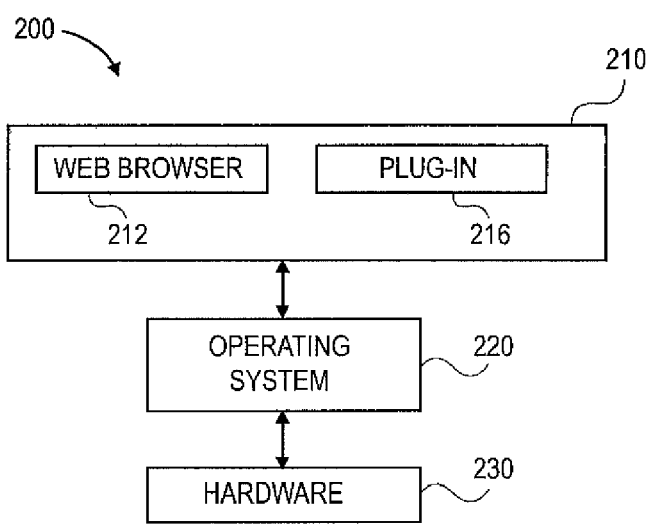
FIG. 2 illustrates a computer architecture that enables a user to communicate with other users who are searching for common subject matter, according to the invention.

FIG. 2 illustrates a computer architecture 200 that enables a user to communicate with other users who are searching for common subject matter, according to the invention. At each of the client PCs 150, 160 and 170, software, firmware, micro code and hardware may be used to provide the specified architecture. The hardware 230 can include one or more processors that can execute any type of computer code devices, such as software, firmware, micro code or the like, to achieve the functionality described herein. A computer program product or program storage device that tangibly embodies such computer code devices, such as a memory device, may also be provided in a manner apparent to those skilled in the art. An operating system 220 can be provided via software executed by the hardware. Application programs 210 can include a conventional search engine application such as a web browser 212, along with a software plug-in 216 that is provided according to the invention for achieving the functionality described herein. The use of a plug-in 216 allows existing web browsers to be used. Optionally, the web browser 212 and the software plug-in 216 need not be separate software components, but their functions may be integrated in whole or in part. That is, the chat feature and the search party notifications can be implemented entirely in the context of a web page, and thereby displayed inside a web browser, without the need for an additional software plug-in to the web browser, as discussed further in connection with FIG. 12.

When a user performs a search using the search engine software such as the web browser 212, the plug-in software 216, which may be provided as an extension to the web browser 212, notices the search and extracts the search query, e.g., the search terms or keywords. The plug-in software 216 initiates a transmission of the search query to the search registry server 120, e.g., using any desired network transmission protocol. The operating system 220 and hardware 230 coordinate to transmit the message initiated by the plug-in software 216 in a manner apparent to those skilled in the art. The search registry server 120 responds to the transmission by analyzing the search query, as discussed previously, to determine whether the search query is for the same subject matter which has been requested by other users, and/or for which a dialogue has already been launched. The search registry server 120 transmits a message back to the plug-in software 216, via the hardware 230 and the operating system 220, indicating whether a dialogue for the searched for subject matter has been launched, and other information such as how many users have joined the dialogue. The plug-in software 216 initiates the display of the information relating to the dialogue on the user interface, e.g., screen. Additionally, similar to the above case, an implementation is possible wherein the client PC only uses a web browser that communicates with the search engine server to achieve the desired functionality, in which case the search engine server returns a web page containing the search party information. In this case, there is no need for a search registry server or a software plug-in to the web browser.

The plug-in software 216 can also fetch chat text from the chat server 110 for the dialogue relating to the searched for subject matter. Furthermore, the plug-in software 216 can communicate with the chat server 110 to provide the user recommendations and annotations discussed previously. The plug-in software 216 can also monitor the user's activities such as for the purpose of processing a user request to exit the dialogue, or automatically removing the user from the dialogue after a specified time-out period in which the user is inactive, for instance, or when it is detected that the user has closed the search engine application or the search party application. The plug-in software 216 can further enable the user to preview a dialogue before joining, as well as transmit additional search queries made by the user to the chat server 110 for sharing with other users in the dialogue. The plug-in software 216 can also allow a user to participate in multiple dialogues at the same time for different subjects, e.g., via different instances of the search engine application, e.g., the web browser 212, in different windows. In one possible approach, discussed further in connection with FIG. 12, the functionality of the software plug-in is provided by a script such as JAVASCRIPT executing within a web page, where a non-rich web page interface is used for display.

Additionally, the plug-in software 216 can provide a rich client application. Such applications provide a richer user interface (UI) by providing a graphical interface with a number of controls for the user. A control refers to, e.g., an object in a window or dialog box that allows a user to interface with the application and operating system. Examples of controls include push-buttons, scroll bars, radio buttons, pull-down menus, dialog boxes, pop-up windows, pull-down menus, icons, resizable window edges, progress indicators, selection boxes, windows, tear-off menus, menu bars, toggle switches and forms. A rich client application can also provide access to local resources in the client PCs such as disk storage and application programming interfaces (APIs). Because they run locally on the client computers, rich client applications use available resources more efficiently, and can speed response times. For example, as a user navigates the application, the application can automatically merge local data with updated information that is transparently picked up across the Internet or other network.

Furthermore, the plug-in software 216 may use the example pseudo-code of Table 1 to achieve some of its functions. The pseudo-code maps to real protocol requests such as TCP/IP requests. TABLE-US-00001

TABLE 1

Figure 3:
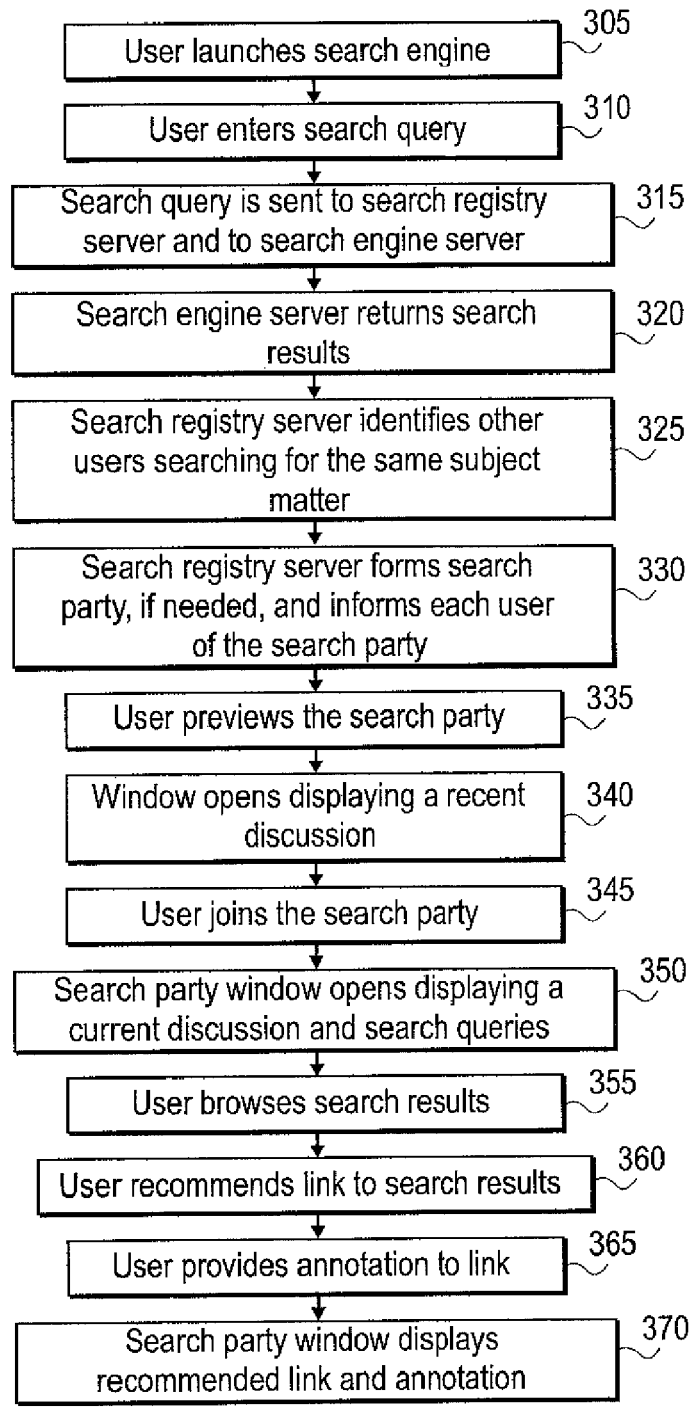
FIG. 3 illustrates a method in which a user communicates with other users who are searching for common subject matter, and recommends a link to the other users, according to the invention.

Pseudo-code:

Description: giveRecentText( )
used to talk to the chat server giveSuggestions( ) used to provide a list of URLs addASuggestion( ) used to share information whosOnline( ) used to obtain a list of users setMyCurrentSearch Terms( ) used to set search terms FIG. 3 illustrates a method in which a user communicates with other users who are searching for common subject matter, and recommends a link to the other users, according to the invention. The sequence of events is meant to be illustrative of one possible scenario, although many variations are possible. At block 305, the user launches a search engine such as a web-based search engine. At block 310, the user enters a search query and, at block 315, the search query is sent to the search registry server and the search engine server. At block 320, the search engine server returns search results and, at block 325, the search registry server identifies other users searching for the same subject matter. This may occur before or after a search party has been launched.

If a search party has been launched, the other users searching for the same subject matter have already been identified, and new users can be added to the existing dialogue. If a dialogue has not yet been launched, the search registry server can identify groups of users searching for the same subject matter using the techniques discussed previously. A search party can be created with two or more users. However, a minimum group size may be set to reduce the number of search party that are launched, so that a new search party is not created until the minimum number of users is identified. A maximum search party size can also be enforced. The users who are searching for common subject matter can be identified, e.g., by maintaining information such as an IP or other network address of the identified users.

At block 330, the search registry server forms a search party, if not already formed, and informs each user of the number of other users who are searching for the same subject matter. At block 335, after being made aware of the existence of a search party, a user can choose to preview the search party, in which case a window is opened on the user interface displaying a recent discussion that is obtained by a backlog of comments made in the past few minutes (block 340). At this point, the user is not actively participating in the dialogue provided by the search party. However, at block 345, the user can choose to actively join the search party, in which case a new window, e.g., a search party window, opens displaying a current discussion and search queries (block 350). The preview window and the search party window may open on top of the existing search engine window, e.g., in a cascaded manner, or on a separate screen of a multi-screen setup, for instance. The user can view the dialogue, or return to browse the search results obtained from the user's initial or subsequent searches (block 355). The user can recommend a link to a search result to share with the other users in the search party (block 360), in addition to sharing a typed in annotation to the link (block 365). In response, the search party window displays the recommended link and the annotation for all users in the search party to view (block 370).

The following figures illustrate an example series of user interfaces that may be provided by the invention.

Figure 4:
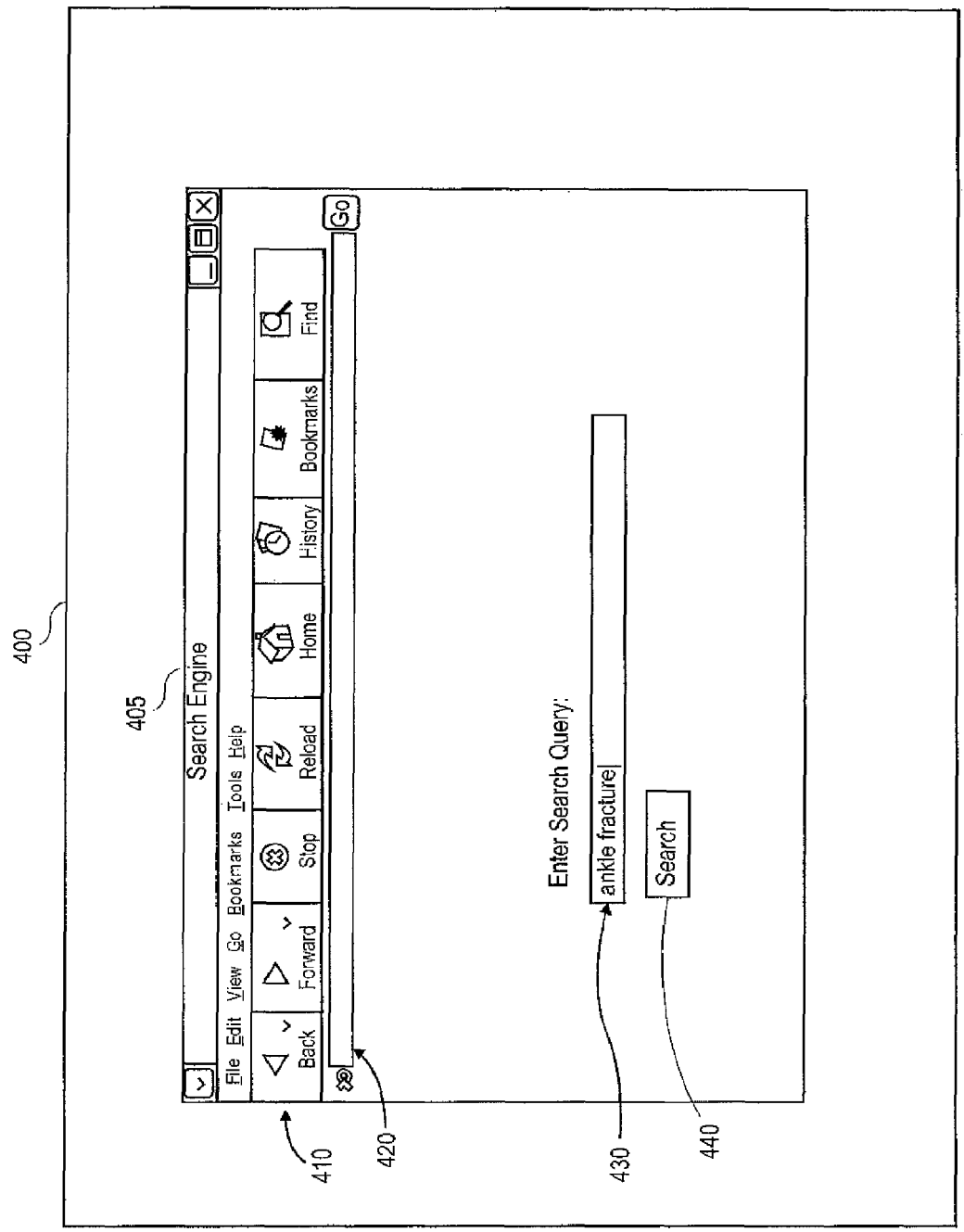
FIG. 4 illustrates a user interface of a conventional search engine.

FIG. 4 illustrates a user interface 400 of a conventional search engine, which includes a window 405 in which a search engine application runs. A background region behind the window 405 may include an interface of a desktop application, for example. The window 405 includes a search engine toolbar 410 with various commands that are conventional for web-based browsers, a region 420 in which the address of a resource on a computer network, such as a URL, can be displayed, and a text box 430 in which a user can type in a search query. Note that the search query can include keywords as well as other search criteria defined by the user. For example, some browsers allow the user to enter an advanced search mode in which the user can specify, e.g., that the search should locate only an exact keyword or keywords, that the keyword should appear in a certain field of a resource, such as the title or abstract, or that a certain category of resources should be searched, e.g., based on a topic such as sports, news, a specific professional field, and so forth. These criteria are part of the search query. In the example provided, the search query is for an "ankle fracture". Such a query might be made by a person who has hurt his or her ankle and is not sure if it is sprained or broken. Once the query is entered, the user clicks on a "search" button 440 to run the search.

Figure 5:
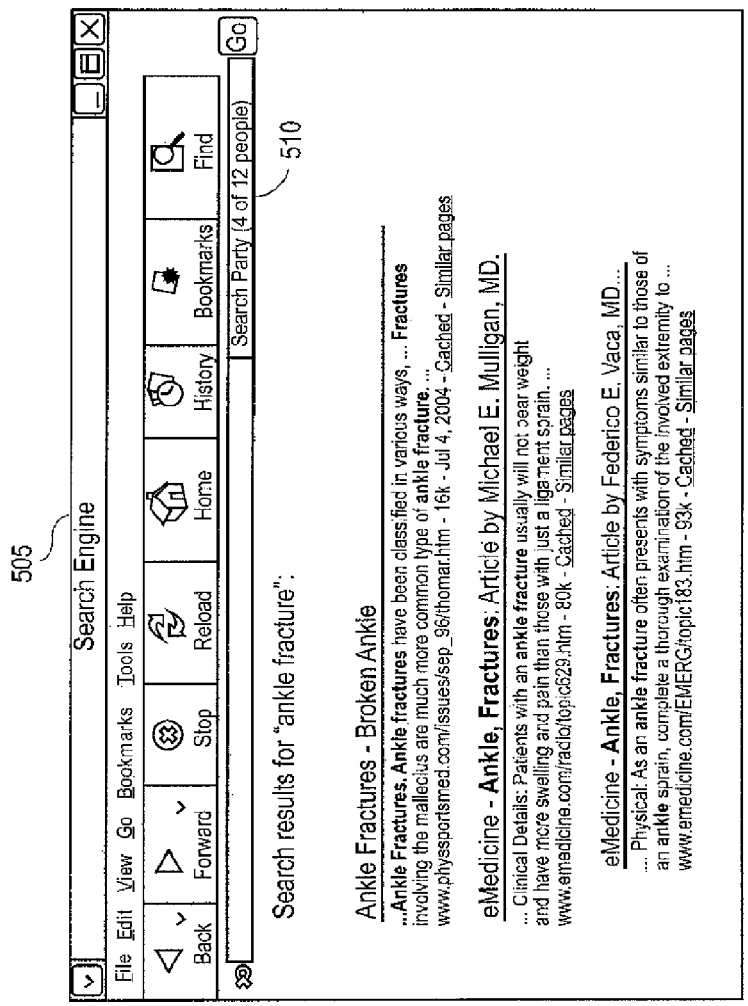
FIG. 5 illustrates the user interface of FIG. 4 in which search results are displayed, and which further indicates that a search party relating to searched for subject matter is available, according to the invention.

FIG. 5 illustrates the user interface of FIG. 4 in which search results are displayed, and which further indicates that a search party relating to searched for subject matter is available, according to the invention. Specifically, the search engine window 505 in the user interface 500 displays links to resources such as web pages having articles relating to ankle fractures. The links may include a title as well as a preview of the text of the resource. Additionally, a toolbar button 510, which reads "Search Party (4 of 12 people)" indicates that a search party relating to the subject matter of ankle fractures is available, and that out of twelve users who are searching for the same subject matter, four of the users have chosen to participate in the search party. As mentioned, the search party allows the users to communicate such as by on-line chatting and sharing links to resources.

Figure 6:
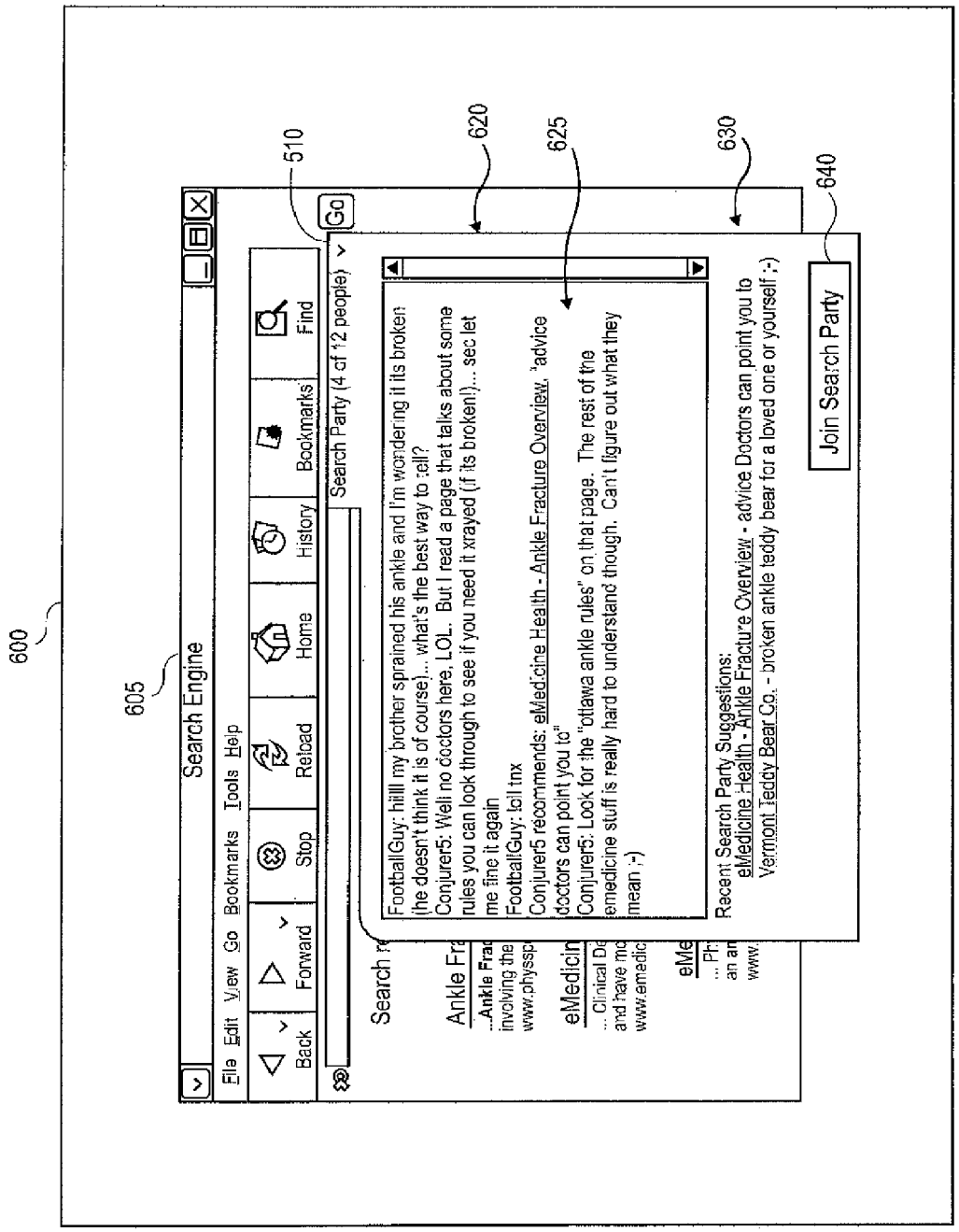
FIG. 6 illustrates a search party preview window, according to the invention.

FIG. 6 illustrates a search party preview window 620, according to the invention. A user may preview a dialogue before joining it by viewing recent discussions between active members, e.g., from stored backlogs of the discussions. This allows a user to quickly ascertain whether the dialogue is of interest. In particular, in the search engine window 605 of the user interface 600, the search party preview window 620 opens when the user clicks on, or mouses over, the button 510, for instance. The chat server 110 can pre-fill the window 620 with the past few minutes of recent discussions so that the user can quickly determine if the search party will be helpful without waiting for new comments to appear. The window 620 includes a region 625 in which the comments of the different users appear next to respective screen names of the users. Additionally, it can be seen that one of the comments includes a hyperlink entitled "eMedicine Health—Ankle Fracture Overview". The user can click on this link to view the associated web page. The window further includes a region 630 that lists recent search party suggestions/links. Although the suggestion relating to "Vermont Teddy Bear Co." does not seem to be relevant, the comments overall seem to be relevant, and the user may choose to join the dialogue by clicking on the "Join Search Party" button 640.

Figure 7:
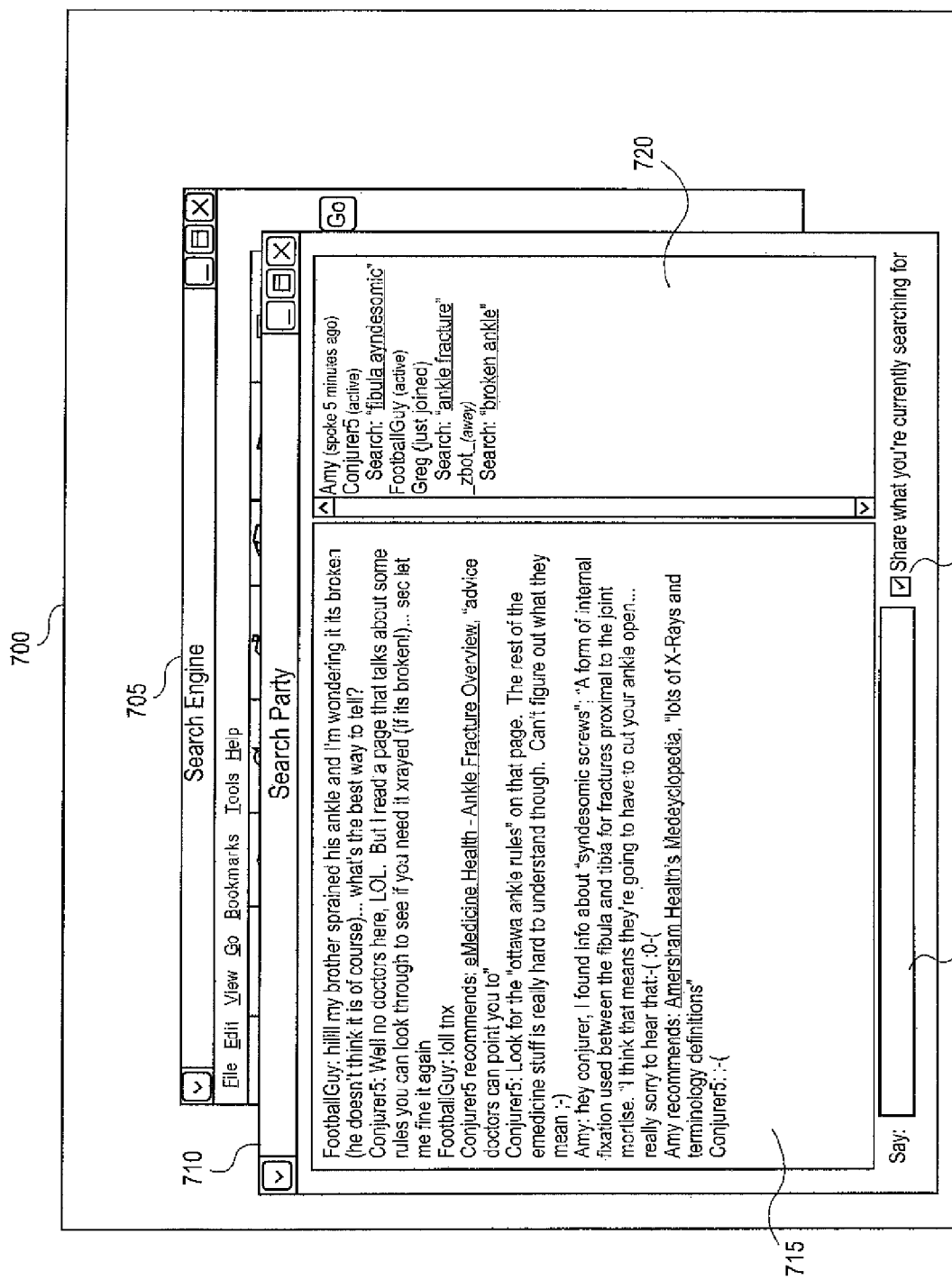
FIG. 7 illustrates a search party window, according to the invention.

FIG. 7 illustrates a search party window 710, according to the invention, which may appear in a cascaded form over the search engine window 705 of the user interface 700. A region 715 of the window 710 includes the live chat from the users in the search party, while a region 720 includes search queries that other users have used, and a member roster that is associated with the chat window. As can be seen, the recent search queries include "fibula syndesome" from a user named "Conjurer5", "ankle fracture", which is the query of the present user, "Greg", who recently joined the search party, and "broken ankle" from a user named "_zbot_", who joined the search party after Greg. The search queries in the region 720 can be updated as the users run further searches. The text in the region 715 is also updated as the users enter additional comments in the dialogue. A checkbox 730 in the window 710 allows the users to indicate whether they elect to have any search queries they provide shared, while still in the search party, with the other users, such as in the region 720. This aids in the dissemination of search strategies. A text box 725 allows the user to type in text that will appear in the chat. After typing in text, the user may press the "enter" key on a keyboard, for example, to cause the text to be transmitted from the local client to the chat server 110, for instance, using techniques apparent to those skilled in the art.

Generally, the search party can be implemented using different types of communication modes. In the example given, on-line chatting is provided along with sharing of links and search queries. However, it is also possible to provide only a subset of these features, or to provide other features. For example, only sharing of links may be provided, or only chatting. Furthermore, the search registry server 120 may analyze the search queries and communications made by the users to better formulate search engine strategies, or for other purposes. The search registry server 120 may also track the number of users that elect to participate in a search party, the average time spent in a search party, and so on, for statistical purposes. In another possible approach, users may consent to sharing certain personal information with the search registry server 120, such as their geographic location, age, gender or other demographic information. In this case, the search registry server 120 can select which users are identified for participation in a search party based on the personal information. For instance, separate search parties may be formed for women and men searching for information on the subject of "motorcycling". In another option, the identified users can send email messages to one another, either using their actual email addresses, or anonymously. In a further possible option, the identified users can be joined in a video or audio conference.

After viewing the search party window 710, the user may decide to return to the previous search results to explore them in further detail. The user may return to the search engine window 805 in the interface 800 by clicking on the search engine window 805, for instance, or by minimizing the search party window 710, as shown in FIG. 8.

Figure 8:
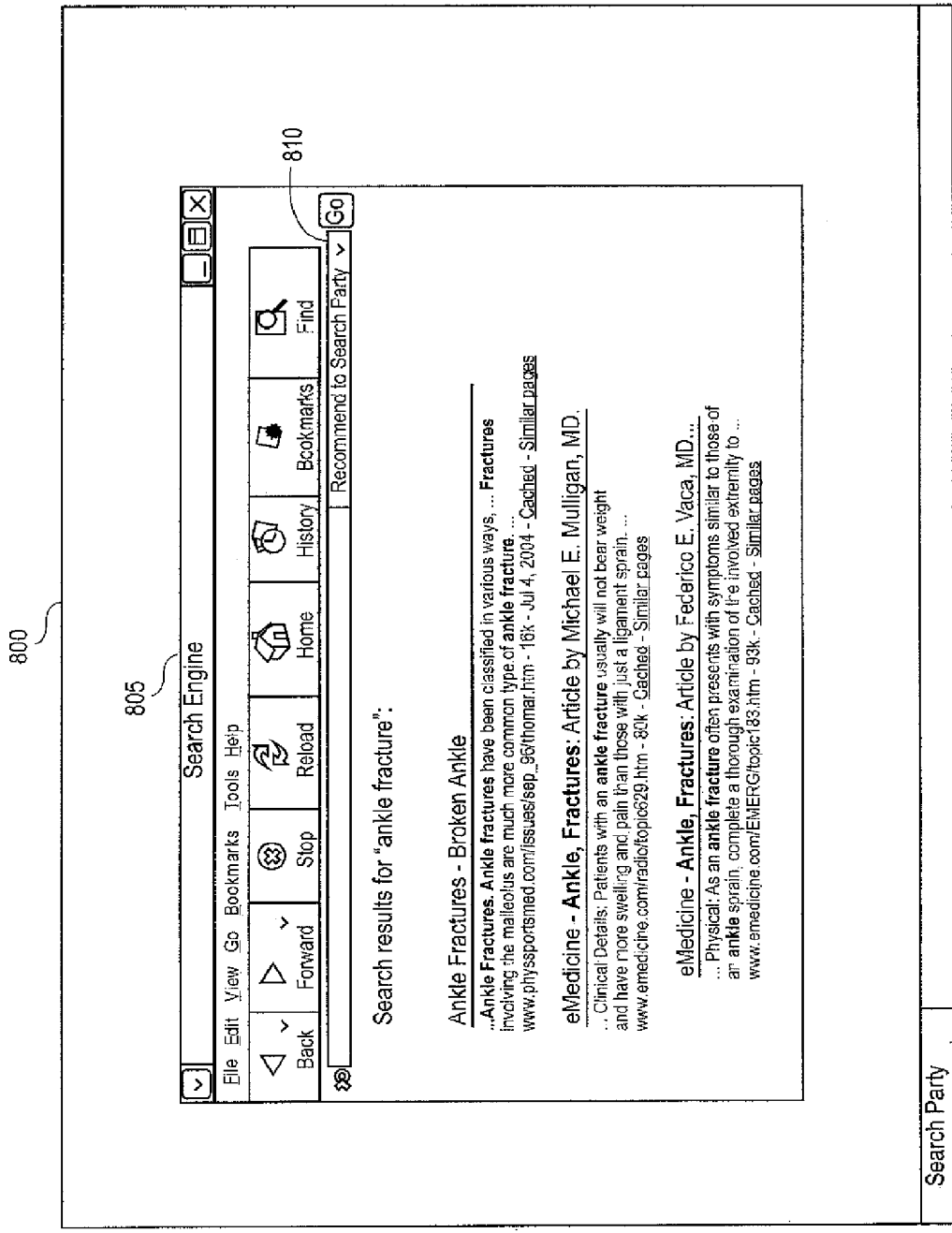
FIG. 8 illustrates the user interface of FIG. 4 which further includes a button that allows a user to recommend a resource located by the search engine to other users in the search party, according to the invention.

FIG. 8 illustrates the user interface of FIG. 4, which further includes a button that allows a user to recommend a resource located by the search engine to other users in the search party, according to the invention. Specifically, when a user has joined a dialogue, a control such as a button 810, entitled "Recommend to Search Party", can be displayed on the search engine window 805 in the user interface 800 to allow the user to recommend a resource such as a web page to other users in the dialogue. Note also that a button 820 at the bottom of the interface 800 indicates that the search party application is running in the background. This application can be returned to the foreground by clicking on the button 820. In the user interface 800, the user has not yet selected a particular resource, so the button 810 is inactive. Clicking on the button 810 causes a recommendation window to appear that allows the user to recommend a specific resource that the user is currently browsing, e.g., by sharing a link to the resource with other users in the dialogue.

Figure 9:
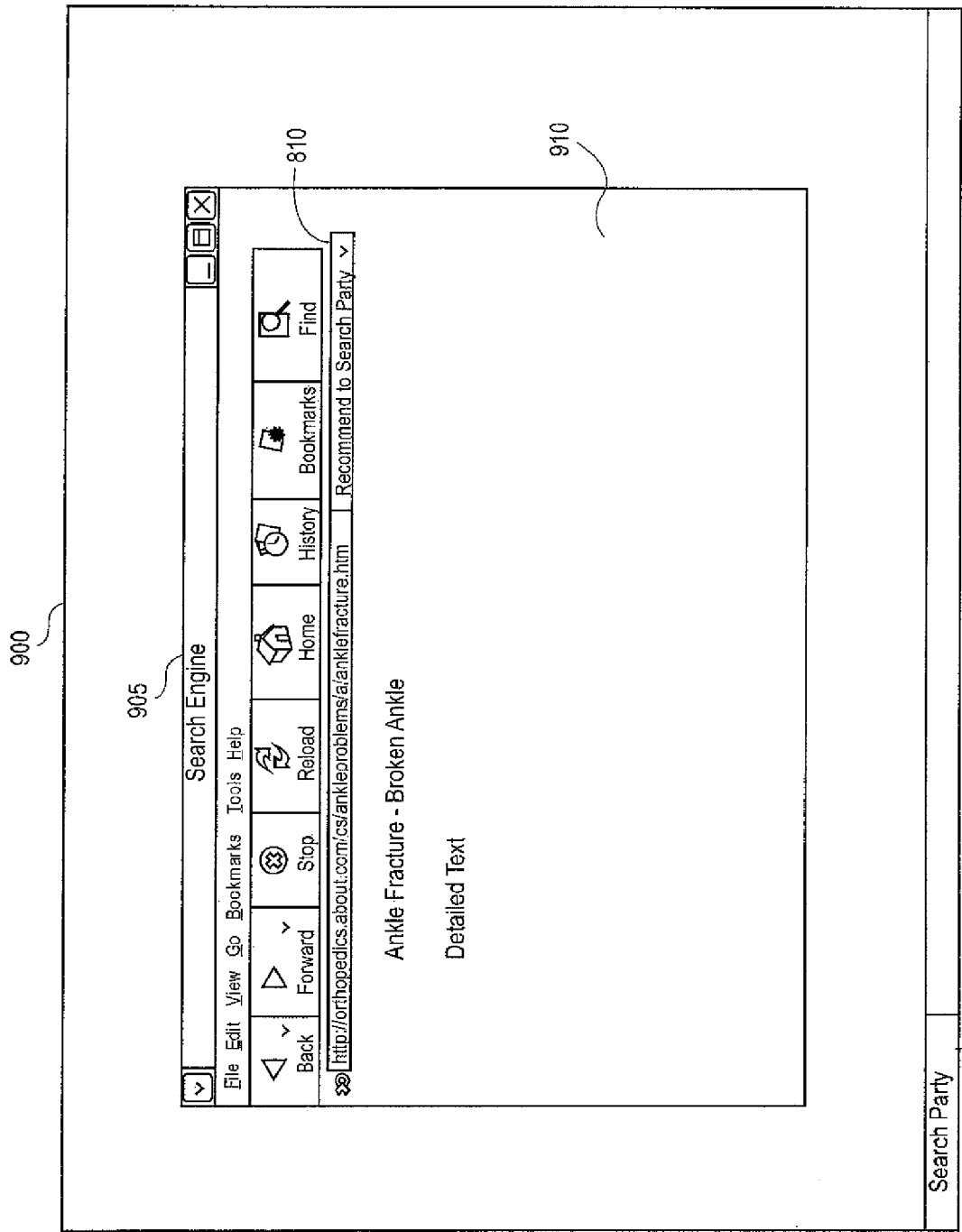
FIG. 9 illustrates a user interface of a search engine which displays a detailed view of a selected resource located by the search engine, where the button that allows the user to recommend the resource to other users in the search party is selected, according to the invention.

FIG. 9 illustrates a user interface of a search engine that displays a detailed view of a selected resource located by the search engine, where the button that allows the user to recommend the resource to other users in the search party is selected, according to the invention. Once the user selects a particular search result to view in detail, the corresponding resource, such as a web page, is displayed in a region 910 of the search engine window 905 in the user interface 900. In the present example, the resource is a web page with a link entitled "Ankle Fractures—Broken Ankle". The detailed text of the web page is also displayed. After reading the web page, the user may decide to click on the "Recommend to Search Party" button 810 to share the resource with the other users in the search party.

Figure 10:
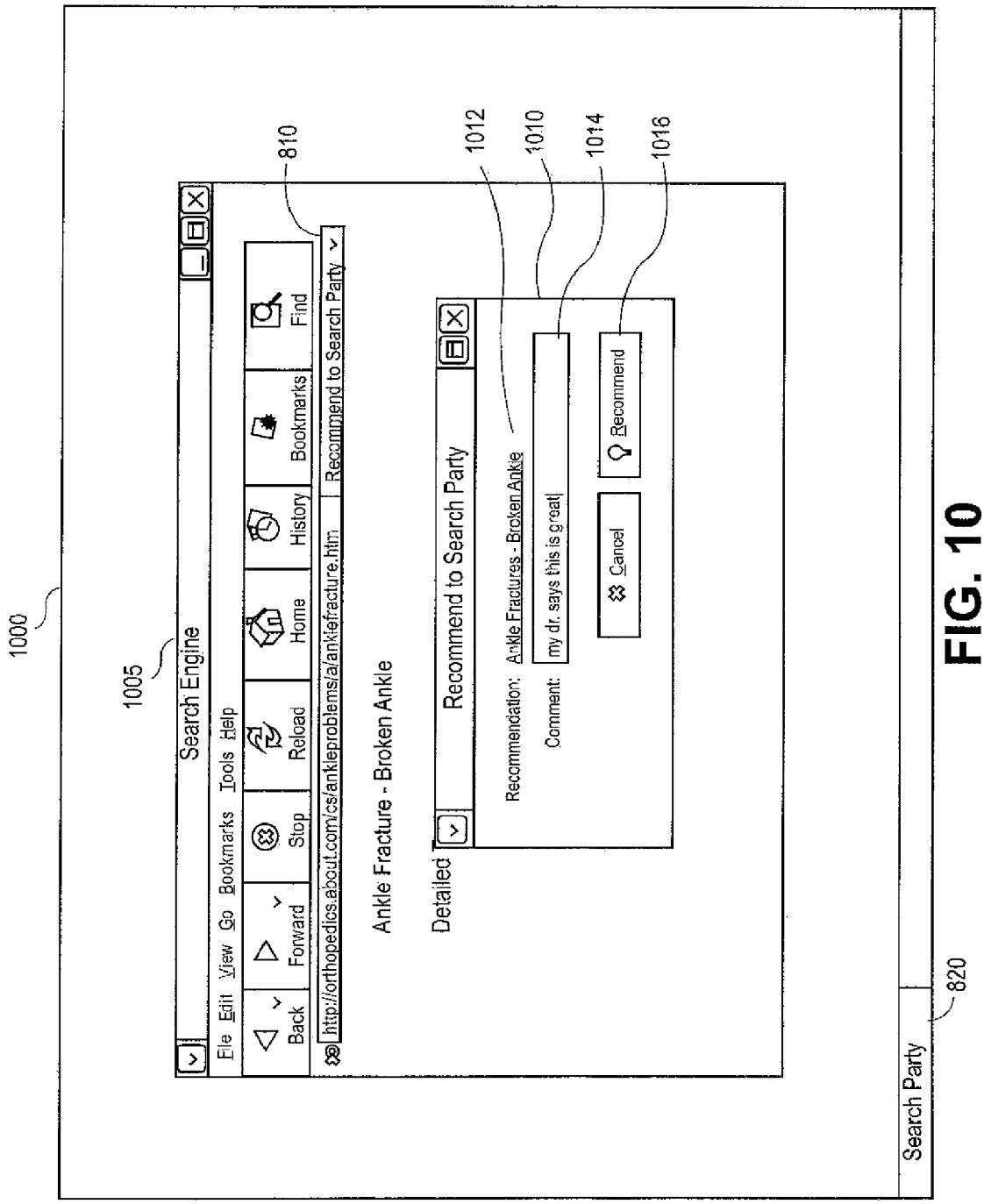
FIG. 10 illustrates a window for entering an annotation to accompany a recommended resource, according to the invention.

FIG. 10 illustrates a window for entering an annotation to accompany a recommended resource, according to the invention. Once the user selects the button 810, a recommendation window 1010 is displayed on the search engine window 1005 on the interface 1000. The window 1010 includes a portion 1012 that is the link to the recommended resource, and a text box portion 1014 that allows the user to type in an annotation to the link. In the present example, the user types in the annotation "my dr. says this is great", and selects the "recommend" button 1016 to transmit the link and the annotation to the chat server 110, for instance, for sharing with the other users in the search party.

Figure 11:
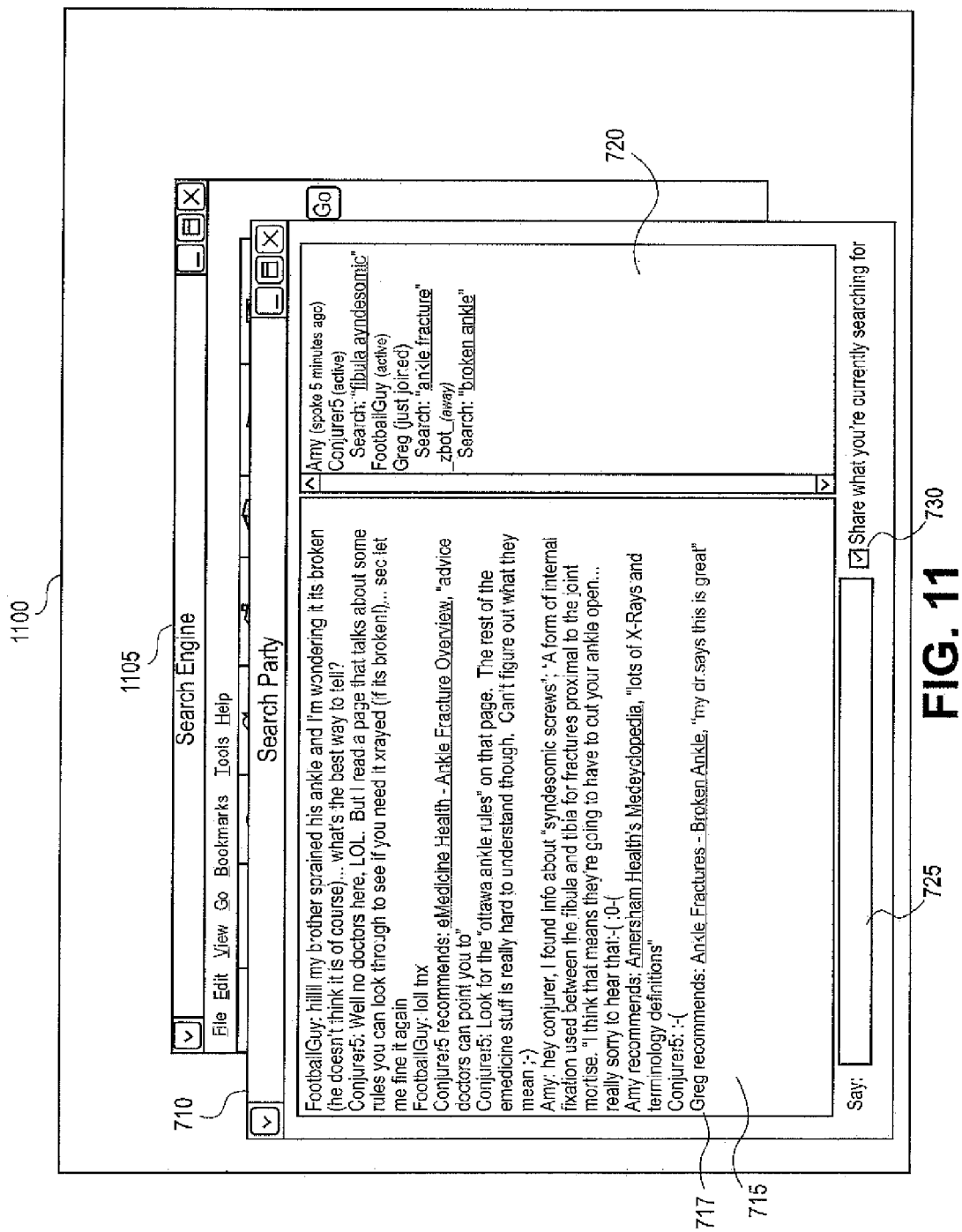
FIG. 11 illustrates the search party window of FIG. 7 in which the recommended resource and the accompanying annotation are displayed, according to the invention.

FIG. 11 illustrates the search party window 710 of FIG. 7 in which the recommended resource and the accompanying annotation are displayed, according to the invention. In particular, the text 717 in the region 715 reads: "Greg recommends: Ankle Fractures—Broken Ankle, 'my dr. says this is great'". The link "Ankle Fractures—Broken Ankle" may appear in a highlighted manner to indicate that it is an active link, such as a URL, that the users can click on to view the associated resource. In this example, the recommendations are displayed together with the general chat, in the region 715. However, it is also possible for the recommendations from the different users to be aggregated and displayed in a region of the dialogue window 710, e.g. at the bottom of the window, that is separate from the region in which the general chat conversation occurs.

Figure 12:
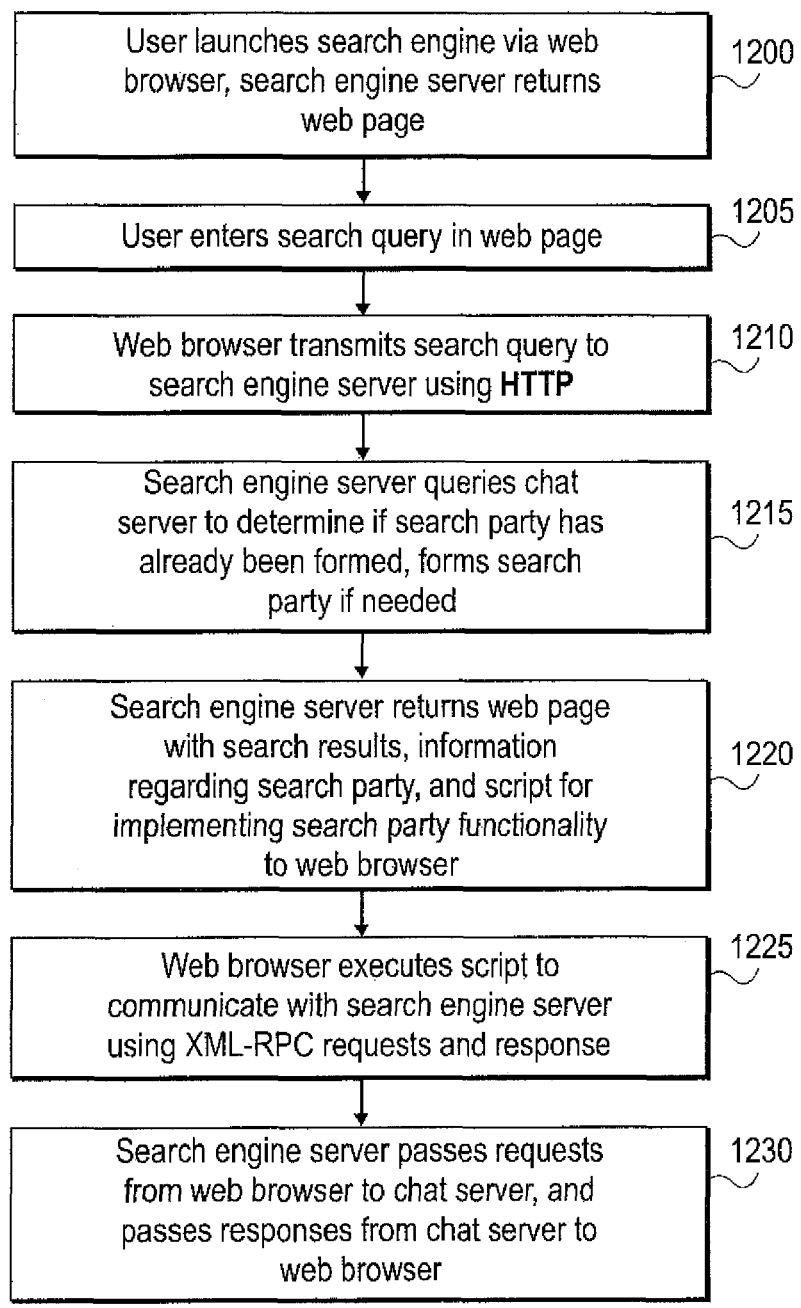
FIG. 12 illustrates a method for carrying out a web page-based embodiment for enabling users who are searching for common subject matter to communicate with one another, according to the invention.

FIG. 12 illustrates a method for carrying out a web page-based embodiment for enabling users who are searching for common subject matter to communicate with one another, according to the invention. As discussed previously in connection with FIG. 2, the functionality of the software plug-in 216 can be provided instead by a script such as JAVASCRIPT executing within a web page, where a non-rich web page interface is used for display. ECMAscript, commonly called JAVASCRIPT or JSCRIPT, is a scripting language that can interact with HTML source code to provide dynamic content for web pages. INTERNET EXPLORER® supports a subset of JAVASCRIPT that MICROSOFT® refers to as JSCRIPT®. A scripting language is a simple or lightweight programming language for writing scripts. A script, also referred to as a macro or batch file, provides a list of commands that can be executed without user interaction.

The embodiment described in FIG. 12 uses a web-page only search engine implementation to achieve the search party functionality. In this case, the search registry server 120 is not needed. At block 1200, the user launches a search engine via a web browser, and the search engine returns a web search page, such as shown in FIG. 4, that is displayed in the web browser. At block 1205, the user enters a search query by typing in one or more search keywords and presses "enter" or selects a "search" button. At block 1210, the web browser transmits the search query to the search engine using a protocol such as HTTP. At block 1215, the search engine server identifies users who are searching for common subject matter, using techniques discussed previously, and queries the chat server 110 to determine if a search party has already been set up for the subject matter. If a search party has already been set up, the search engine server obtains information relating to the search, such as the number of eligible and actual participants, and past chat discussion text. The search engine server can alternatively form a search party, if needed. The search engine server also performs a search using the search query to obtain search results.

At block 1220, the search engine server returns a web page containing the results of the search to the web browser. Other information that is returned to the web browser can include the information regarding the search party, such as the availability of the search party, the number of people currently participating, past chat discussion text, and so forth, in addition to a script program implementation of software for implementing the search party functionality. A script can be provided that works inside web pages and displays information using the web browser. When the script executes, the search party chat box is added to the search web page, which contains the search results, as seen in FIG. 7. Advantageously, with this approach, there is no need for the user to install additional software to achieve the search party functionality.

At block 1225, the web browser can execute the script to communicate with the search engine, such as by using XML-RPC requests and responses. RPC, or remote procedure call, is a type of protocol that allows a program on one computer to execute a program on a server computer. Using RPC, a system developer is not required to develop specific procedures for the server. The client program sends a message to the server with appropriate arguments and the server returns a message containing the results of the program executed. CORBA and DCOM provide the same types of capabilities as traditional RPCs, and may also be used. XML-RPC is newer than DCOM and CORBA, though it is more simplistic, being designed for web use rather than complicated enterprise RPC needs. In particular, XML-RPC is a technique for encoding procedure call strings as simple XML, which are then interpreted by the server software. XML-RPC requires the server computer to have code that is responsive to the XML-RPC protocol requests, it does not allow the client to execute arbitrary code on the server. The main advantage of XML-RPC is that it is easy to use from a lightweight scripting language such as JAVASCRIPT.

At block 1230, the search engine server passes requests or calls from the web browser to the chat server, and passes the corresponding responses back to the script, such as ECMAscript code, inside the web page/browser. This communication may use code that is analogous to the pseudocode API described above in connection with Table 1.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention.

What is claimed is:

1. A method comprising:
   receiving, by a processor from a first user, a first search query comprising a first keyword associated with a particular subject;
   receiving, by the processor from a second user, a second search query comprising a second keyword associated with the particular subject;
   launching, by the processor, a dialogue window for the first user and the second user to communicate with one another;
   receiving, by the processor from a third user, a third search query comprising a third keyword associated with the particular subject, wherein the first, second, and third keywords comprise the same keyword or different keywords;
   locating, by the processor in response to the third search query, the dialogue window;
   retrieving, by the processor, a backlog of an active discussion between the first user and the second user in the dialogue window; and
   providing, by the processor to the third user, the backlog of the active discussion and a suggested link relating to the active discussion.

2. The method of claim 1, wherein the suggested link comprises a hyperlink to a resource relating to the particular subject.

3. The method of claim 1, further comprising receiving, from the third user, a request to join the active discussion between the first user and the second user.

4. The method of claim 1, further comprising receiving the suggested link relating to the active discussion from one of the first user or the second user.

5. The method of claim 1, wherein the backlog of the active discussion comprises the suggested link.

6. A non-transitory computer program storage device including instructions that, when executed by a processor, cause the processor to perform operations comprising:
   receiving, by the processor from a first user, a first search query comprising a first keyword associated with a particular subject;
   receiving, by the processor from a second user, a second search query comprising a second keyword associated with the particular subject;
   launching, by the processor, a dialogue window for the first user and the second user to communicate with one another;
   receiving, by the processor from a third user, a third search query comprising a third keyword associated with the particular subject, wherein the first, second, and third keywords comprise the same keyword or different keywords;
   locating, by the processor in response to the third search query, the dialogue window;
   retrieving, by the processor, a backlog of an active discussion between the first user and the second user in the dialogue window; and
   providing, by the processor to the third user, the backlog of the active discussion and a suggested link relating to the active discussion.

7. The non-transitory computer program storage device of claim 6, wherein the suggested link comprises a hyperlink to a resource relating to the particular subject.

8. The non-transitory computer program storage device of claim 6, further comprising receiving, from the third user, a request to join the active discussion between the first user and the second user.

9. The non-transitory computer program storage device of claim 6, receiving the suggested link relating to the active discussion from one of the first user or the second user.

10. The non-transitory computer program storage device of claim 6, wherein the backlog of the active discussion comprises the suggested link.

11. A computer system comprising:
    a memory; and
    a processor coupled to the memory, the processor to execute the instructions to:
      receive, from a first user, a first search query comprising a first keyword associated with a particular subject;
      receive, from a second user, a second search query comprising a second keyword associated with the particular subject;
      launch a dialogue window for the first user and the second user to communicate with one another,
      receive, from a third user, a third search query comprising a third keyword associated with the particular subject, wherein the first, second, and third keywords comprise the same keyword or different keywords,
      locate, in response to the third search query, the dialogue window;
      retrieve a backlog of an active discussion between the first user and the second user in the dialogue window, and provide, to the third user, the backlog of the active discussion and a suggested link relating to the active discussion.

12. The computer system of claim 11, wherein the suggested link comprises a hyperlink to a resource relating to the particular subject.

13. The computer system of claim 11, the processor to receive, from the third user, a request to join the active discussion between the first user and the second user.

14. The computer system of claim 11, further comprising receiving the suggested link relating to the active discussion from one of the first user or the second user.

15. The computer system of claim 11, wherein the backlog of the active discussion comprises the suggested link.

* * * * *